(12) United States Patent
Hwang et al.

(10) Patent No.: US 6,624,827 B1
(45) Date of Patent: Sep. 23, 2003

(54) APPARATUS AND METHOD FOR LOCKING OR PROHIBITING ACCESS TO DESIGNATED OBJECT DISPLAYED ON SHARED ELECTRONIC WHITEBOARD

(75) Inventors: Dae-Joon Hwang, 11-104 Sunkyung Apt., Daechi-dong, Kangnam-Ku, Seoul (KR); Jeong-Woo Lee, Suwon (KR)

(73) Assignee: Dae-Joon Hwang, Seoul (KR)

( * ) Notice: Subject to any disclaimer, the term of this patent is extended or adjusted under 35 U.S.C. 154(b) by 470 days.

(21) Appl. No.: 09/633,259

(22) Filed: Aug. 4, 2000

(30) Foreign Application Priority Data

Oct. 19, 1999 (KR) ......................... 1999-45362

(51) Int. Cl.[7] ............................ G09G 5/00; G09F 15/16
(52) U.S. Cl. ........................................ 345/753; 709/204
(58) Field of Search ................................. 345/743, 753, 345/751, 752, 758; 709/107, 108, 204, 205, 206, 207

(56) References Cited

U.S. PATENT DOCUMENTS

| | | | |
|---|---|---|---|
| 5,828,838 A | * 10/1998 | Downs et al. | 709/204 |
| 5,949,414 A | * 9/1999 | Namikata et al. | 345/753 |
| 5,995,096 A | * 11/1999 | Kitahara et al. | 345/753 |
| 6,104,706 A | * 8/2000 | Richter et al. | 370/263 |
| 6,192,395 B1 | * 2/2001 | Lerner et al. | 709/204 |
| 6,212,547 B1 | * 4/2001 | Ludwig et al. | 709/204 |
| 6,286,034 B1 | * 9/2001 | Sato et al. | 709/204 |
| 6,332,153 B1 | * 12/2001 | Cohen | 709/204 |

* cited by examiner

Primary Examiner—Kristine Kincaid
Assistant Examiner—Thanh T Vu
(74) Attorney, Agent, or Firm—Greenblum & Bernstein, P.L.C.

(57) ABSTRACT

A method for locking or prohibiting an access to at least one object in an electronic conferencing system, includes the steps of: a) initiating an electronic conference in the conference initiator system having an electronic whiteboard, the electronic whiteboard containing at least one object; b) participating conference participant systems in the electronic conference, thereby sharing the electronic whiteboard with the conference initiator system; c) sending a lock request corresponding to the object from a conference participant system to the conference initiator system in order to obtain the priority over the access to the object corresponding to the lock request from the conference initiator system or prohibit the access to the object performed by another conference participant system not having the priority; and d) giving a priority over an access to the object to the conference participant system according to a sequence of lock requests in response to the lock request.

33 Claims, 6 Drawing Sheets

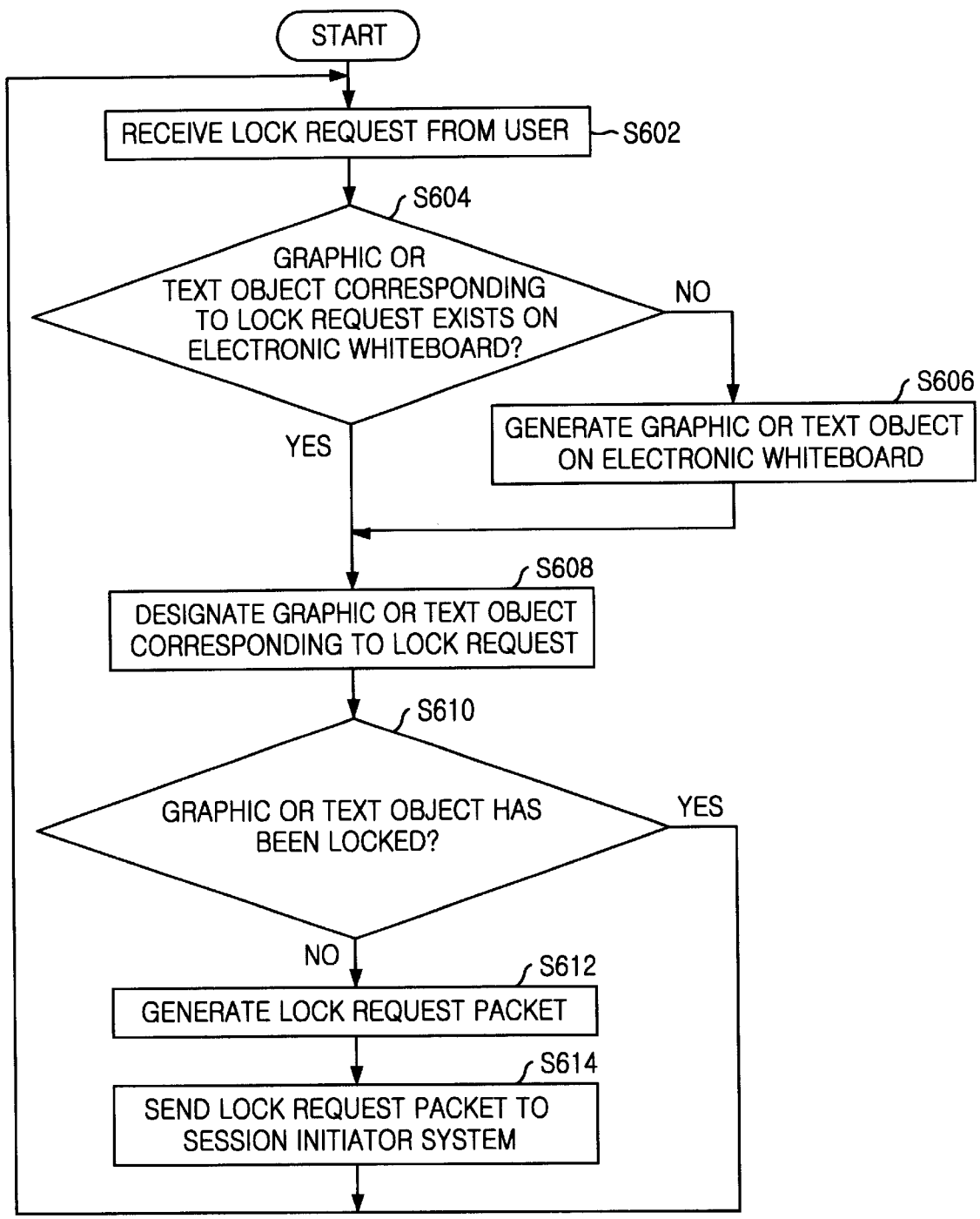

APPARATUS AND METHOD FOR LOCKING OR PROHIBITING ACCESS TO DESIGNATED OBJECT DISPLAYED ON SHARED ELECTRONIC WHITEBOARD

FIELD OF THE INVENTION

The present invention relates to an electronic conferencing system; and, more particularly, to an apparatus and method, for use in the electronic conferencing system, for locking or prohibiting an access to a designated object displayed on a shared electronic whiteboard.

DESCRIPTION OF THE PRIOR ART

Generally, an electronic conferencing system is employed in an electronic conference. The electronic conferencing system includes a session initiator system as a conference initiator system and a plurality of session participant systems as conference participant systems. The session initiator system initiates the electronic conference. One of the session participant systems participates in the electronic conference initiated by the session initiator system. The session initiator system and the session participant systems are implemented as a personal computer. During a session between the session initiator system and the session participant systems is ongoing, the session initiator system and the session participant systems share a media component, i.e., an electronic whiteboard, to perform a collaborative work through the electronic whiteboard. The session is a state where the session initiator system and at least one session participant system communicate with each other.

The electronic whiteboard includes a plurality of whiteboard pages. One of the whiteboard pages includes a plurality of objects. The session initiator system needs to give a priority over a designated object to a session participant system so that another session participant system, not taking the priority, can not access the designated object displayed on the shared electronic whiteboard. Further, the session initiator system needs to effectively lock or prohibit the access to the designated object from another session participant system not taking the priority.

SUMMARY OF THE INVENTION

It is, therefore, an object of the present invention to provide an apparatus and method for locking or prohibiting an access to a designated object displayed on a shared electronic whiteboard by allowing only a conference participant system, having a priority over the designated object, to access the designated object.

It is, therefore, another object of the present invention to provide a computer-readable media storing program instructions, the program instructions disposed on a computer to perform a method for locking or prohibiting an access to a designated object displayed on a shared electronic whiteboard by allowing only a conference participant system, having a priority over the designated object, to access the designated object.

In accordance with an aspect of the present invention, there is provided an apparatus for locking or prohibiting an access to at least one object, comprising: a conference initiator means having an electronic whiteboard for initiating an electronic conference, the electronic whiteboard containing at least one object, wherein said conference initiator means gives a priority over an access to the object according to a sequence of lock requests; and a plurality of conference participant means for participating in the electronic conference, thereby sharing the electronic whiteboard with said conference initiator means, wherein one of said conference participant means sends a lock request corresponding to the object to said conference initiator means in order to obtain the priority over the access to the object corresponding to the lock request from said conference initiator means or prohibit the access to the object performed by said conference participant means not having the priority.

In accordance with another aspect of the present invention, there is provided an electronic conferencing system for locking or prohibiting an access to at least one object, comprising: a conference initiator means having an electronic whiteboard for initiating an electronic conference, the electronic whiteboard containing at least one object, wherein said conference initiator means gives a priority over an access to the object according to a sequence of lock requests; and a plurality of conference participant means for participating in the electronic conference, thereby sharing the electronic whiteboard with said conference initiator means, wherein one of said conference participant means sends a lock request corresponding to the object to said conference initiator means in order to obtain the priority over the access to the object corresponding to the lock request from said conference initiator means or prohibit the access to the object performed by said conference participant means not having the priority.

In accordance with further another aspect of the present invention, there is provided a method for locking or prohibiting an access to at least one object in an electronic conferencing system, comprising the steps of: a) initiating an electronic conference in the conference initiator system having an electronic whiteboard, the electronic whiteboard containing at least one object; b) participating conference participant systems in the electronic conference, thereby sharing the electronic whiteboard with the conference initiator system; c) sending a lock request corresponding to the object from a conference participant system to the conference initiator system in order to obtain the priority over the access to the object corresponding to the lock request from the conference initiator system or prohibit the access to the object performed by another conference participant system not having the priority; and d) giving a priority over an access to the object to the conference participant system according to a sequence of lock requests in response to the lock request.

In accordance with furthermore another aspect of the present invention, there is provided a computer-readable media storing program instructions, the program instructions disposed on a computer to perform a method for locking or prohibiting an access to at least one object in an electronic conferencing system, comprising the steps of: a) initiating an electronic conference in the conference initiator system having an electronic whiteboard, the electronic whiteboard containing at least one object; b) participating conference participant systems in the electronic conference, thereby sharing the electronic whiteboard with the conference initiator system; c) sending a lock request corresponding to the object from a conference participant system to the conference initiator system in order to obtain the priority over the access to the object corresponding to the lock request from the conference initiator system or prohibit the access to the object performed by another conference participant system not having the priority; and d) giving a priority over an access to the object to the conference participant system according to a sequence of lock requests in response to the lock request.

BRIEF DESCRIPTION OF THE DRAWINGS

The above and other objects and features of the instant invention will become apparent from the following description of preferred embodiments taken in conjunction with the accompanying drawings, in which:

FIGS. 4 to 6 are flowcharts describing a method for locking or prohibiting an access to a designated object by controlling a command sequence in accordance with the present invention.

DETAILED DESCRIPTION OF THE INVENTION

Figure 1:
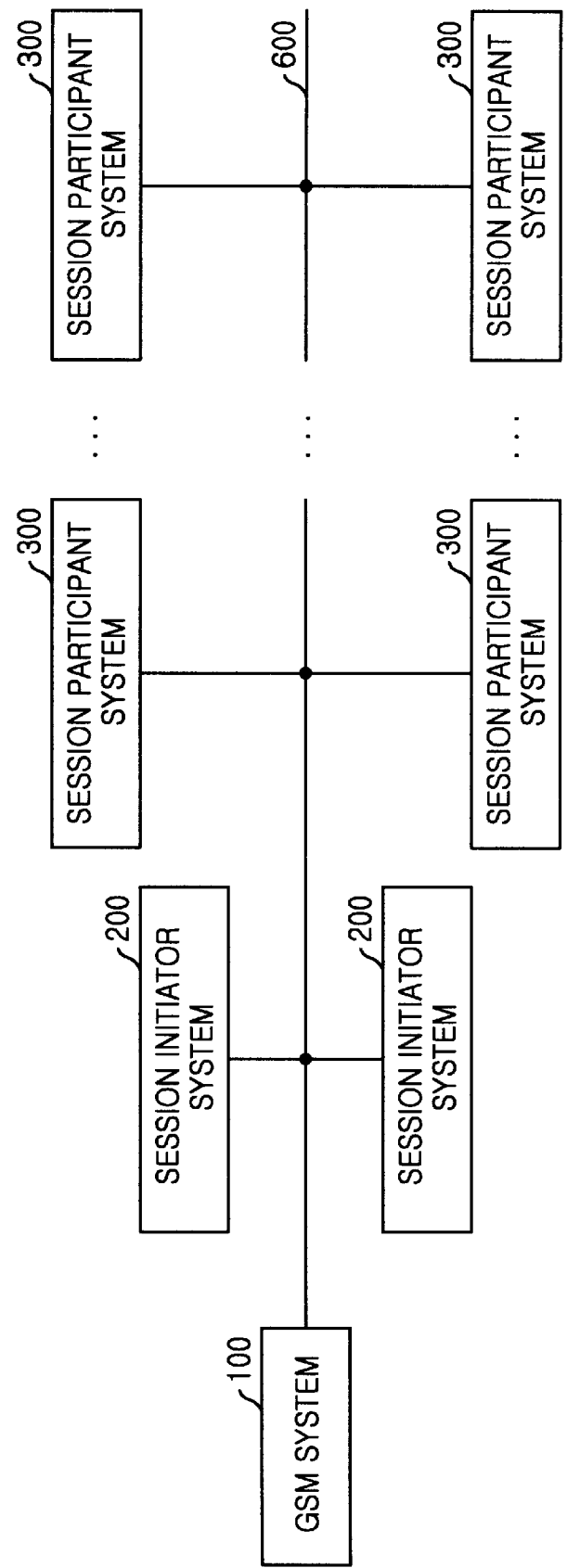
FIG. 1 is a block diagram illustrating an electronic conferencing system to which the present invention is applied.

Referring to FIG. 1, there is shown a block diagram illustrating an electronic conferencing system to which the present invention is applied. As shown, the electronic conferencing system includes a global session manager (GSM) system 100, session initiator systems 200 as conference initiator systems having media components (not shown) and session participant systems 300 as conference participant systems having the media components. The electronic conferencing system is based on Internet, a wide area network (WAN) and a local area network (LAN). The session initiator and participant systems 200 and 300 can be implemented as a personal computer.

The GSM system 100, coupled to the common communication line 600, globally manages session information necessary for an electronic conference, wherein the session information includes a session identifier, information of available session resources and a list of sessions. When the session between the GSM system 100 and a session initiator system 200 is established, the GSM system 100 allocates the session identifier and the available session resources to the session initiator system 200.

The session initiator system 200, coupled to the common communication line 600, initiates and creates the session by obtaining the session identifier and the available session resources from the GSM system 100.

When a session-participant system 300, coupled to the common communication line 600, wants to participate in the session, the session participant system 300 selects the session in the list of sessions from the GSM system 100. Then, the session participant system 300 obtains the session identifier and the available session resources necessary for the session from the GSM system 100. Thus, the session participant systems 300 participate in the session initiated and created by the session initiator system 200.

Figure 2:
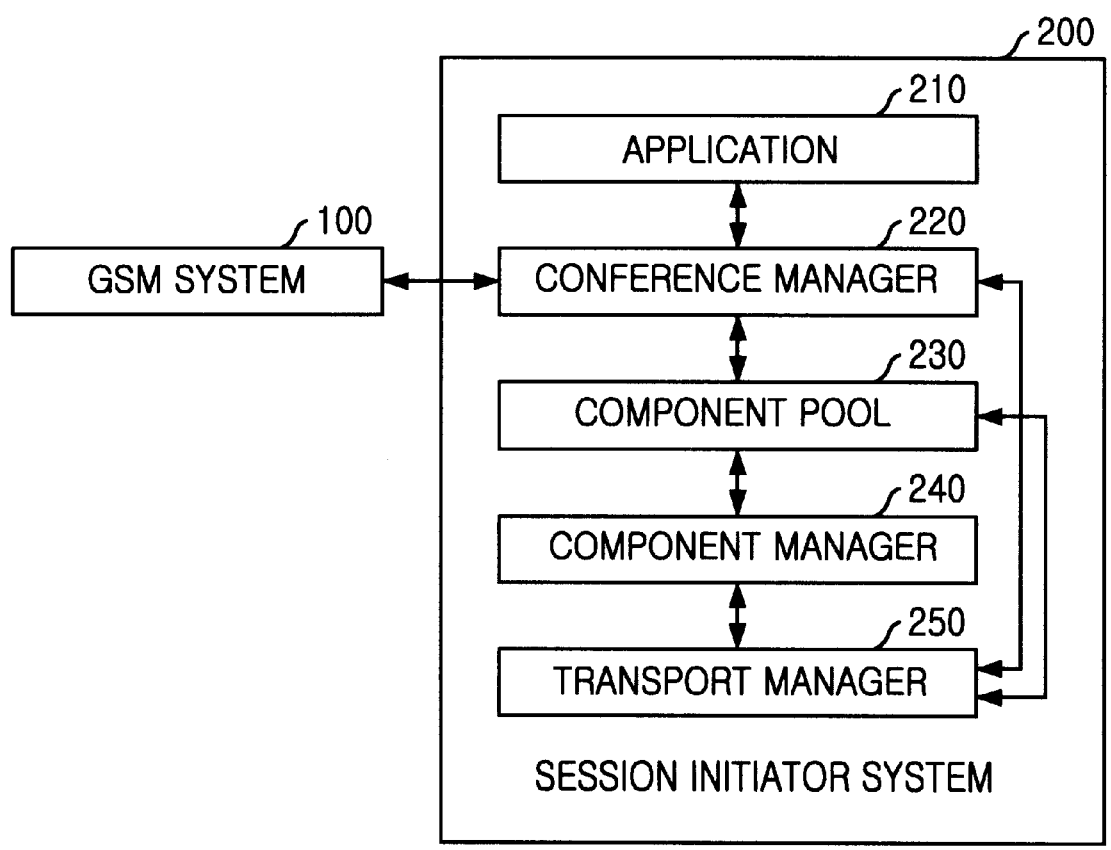
FIG. 2 is a block diagram showing a session initiator system shown in FIG. 1.

Referring to FIG. 2, there is shown a block diagram illustrating a session initiator system shown in FIG. 1. As shown, a session initiator system 200 includes an application 210, a conference manager 220, a component pool 230, a component manager 240 and a transport manager 250. A structure of the session initiator system 200 is the same as that of a session participant system 300 shown in FIG. 1.

The application 210 of the session initiator system 200 is interfaced between a GSM system 100 and the session initiator system 200. Further, the application 210 of the session participant system 300 is interfaced with the session initiator system 200.

The conference manager 220 of the session initiator system 200 manages session information including information of session participant systems 300, and creates the component pool 230 and the component manager 240. Further, the conference manager 220 of the session participant system 300 manages session information including information of the session initiator system 200.

The component pool 230 of the session initiator system 200 displays the session information including the information of the session participant systems 300 from the conference manager 220. Further, the component pool 230 of the session participant system 300 displays the session information including the information of the session initiator system 200 from the conference manager 220.

The component manager 240 of the session initiator system 200 or the session participant system 300 allocates an identifier to a media component. The media component includes a chatter, a messenger, a digital carousel, an electronic whiteboard and the like. Further, the component manager 240 of the session initiator system 200 or the session participant system 300 adds or deletes the media component.

The transport manager 250 of the session initiator system 200 or the session participant system 300 supports a dynamic port and a transmission protocol. The transmission protocol includes a transmission control protocol (TCP), a user datagram protocol (UDP), an Internet protocol (IP), a simple mail transfer protocol (SMTP) and so on. Further, the transport manager 250 sends a packet from the session initiator system 200 to the session participant system 300 or from the session participant system 300 to the session initiator system 200.

Figure 3:
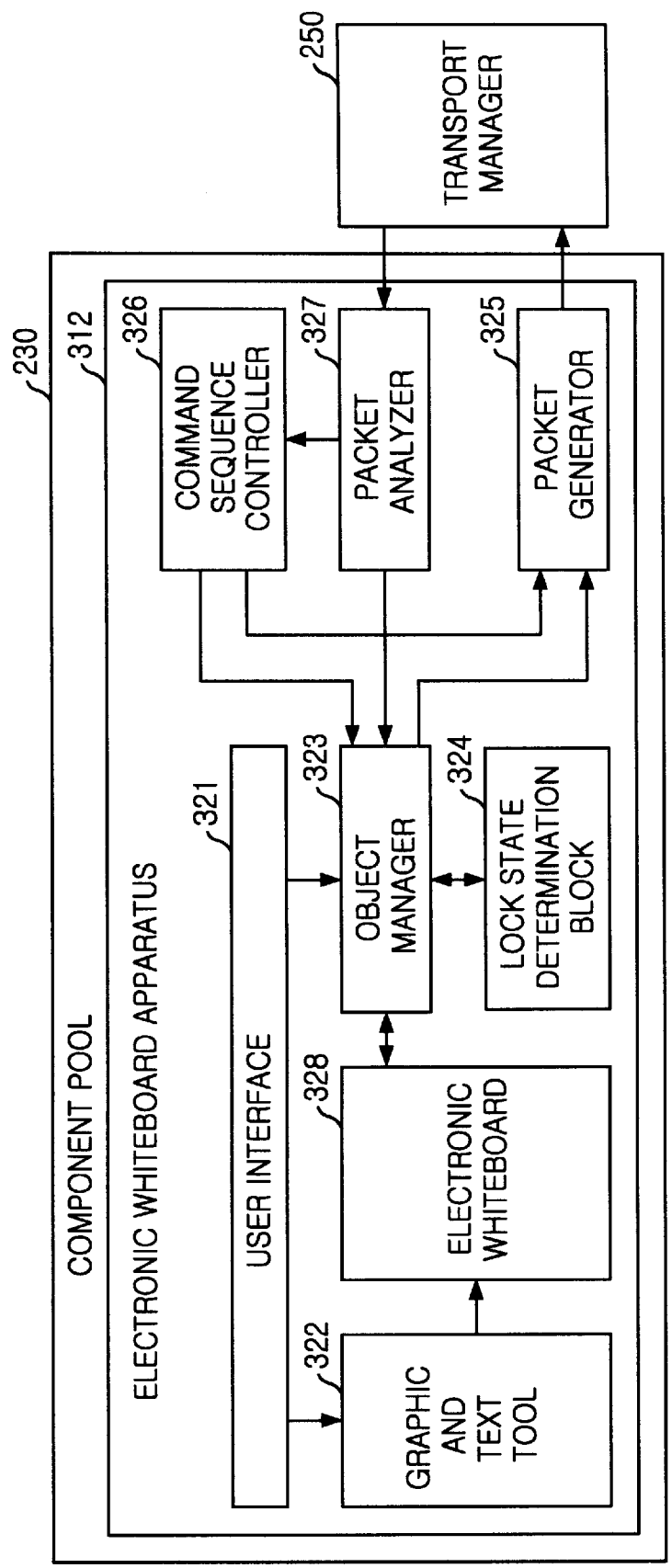
FIG. 3 is a block diagram depicting an electronic whiteboard apparatus in accordance with the present invention.

Referring to FIG. 3, there is shown an electronic whiteboard apparatus in accordance with the present invention, wherein the electronic whiteboard apparatus is contained in a component pool shown in FIG. 2. As shown, an electronic whiteboard apparatus 312 includes a user interface 321, a graphic and text tool 322, an object manager 323, a lock manager 324, a packet generator 325, a command sequence controller 326, a packet analyzer 327 and an electronic whiteboard 328. The electronic whiteboard 328 includes a plurality of whiteboard pages and one of the whiteboard pages has a plurality of objects containing a graphic object and a text object.

The user interface 321, interfaced with a user, receives a user request from the user of a session initiator system 200 shown in FIG. 1. The user interface 321 sends the user request to the graphic and text tool 322 or the object manager 323.

The graphic and text tool 322, coupled to the user interface 321, generates a graphic or text object on the electronic whiteboard in response to the user request.

The object manager 323, coupled to the user interface 321 and the graphic and text tool 322, manages and changes information of the graphic or text object locked by a lock request received from the user of a session initiator system 200 shown in FIG. 1. The object manager 323 designates the graphic or text object in response to a lock request as the user request. Then, the object manager 323 sends the lock request corresponding to the designated graphic or text object to the packet generator 325.

The lock state determination block 324, coupled to the object manager 323, determines whether a designated graphic or text object has been locked.

The packet generator 325 generates a lock request packet if the designated graphic or text object has been locked by the lock request received from one of the session participant systems 300 or the session initiator system 200. Then, the packet generator 325 sends the lock request packet to the session participant systems 300 coupled to the session initiator system 200.

Further, the packet generator 325 generates a lock release command request. The packet generator 325 sends the lock release command request to a session participant system 300 that has first sent the lock request packet to the session initiator system 200.

The packet analyzer 327 analyzes packets received from the session participant systems 300. The packet analyzer 327 determines whether the packets include a lock request packet. If the packets include the lock request packet, the packet analyzer 327 sends the lock request packet to the command sequence controller 326. If the packets do not include the lock request packet, the packet analyzer 327 sends the packets to the object manager 323. At this time, the object manager 323 identifies the graphic or text object corresponding to each packet. Then, the object manager 323 changes a state of the graphic or text object corresponding to each packet.

Figure 4:
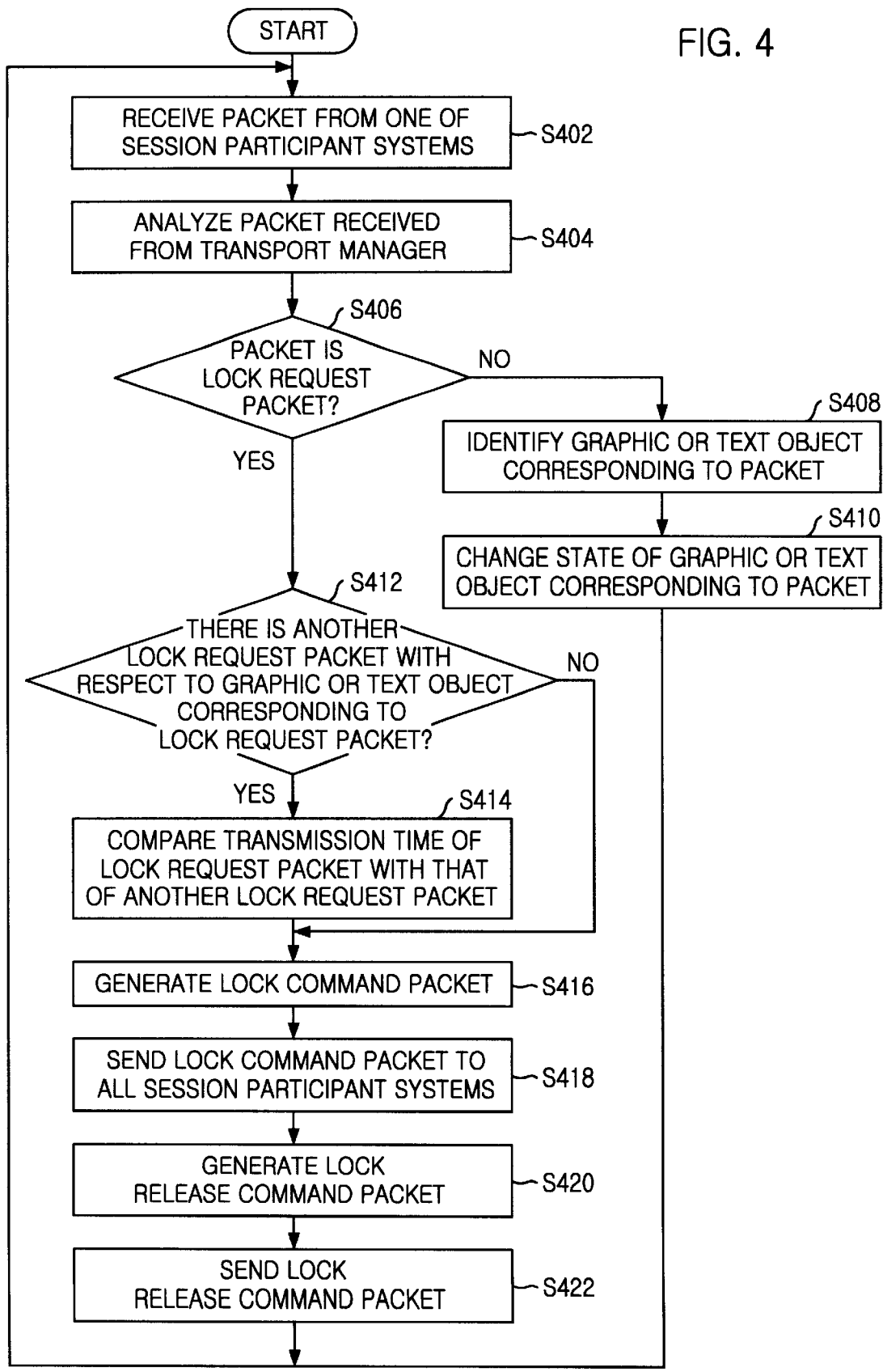
Figure 5:
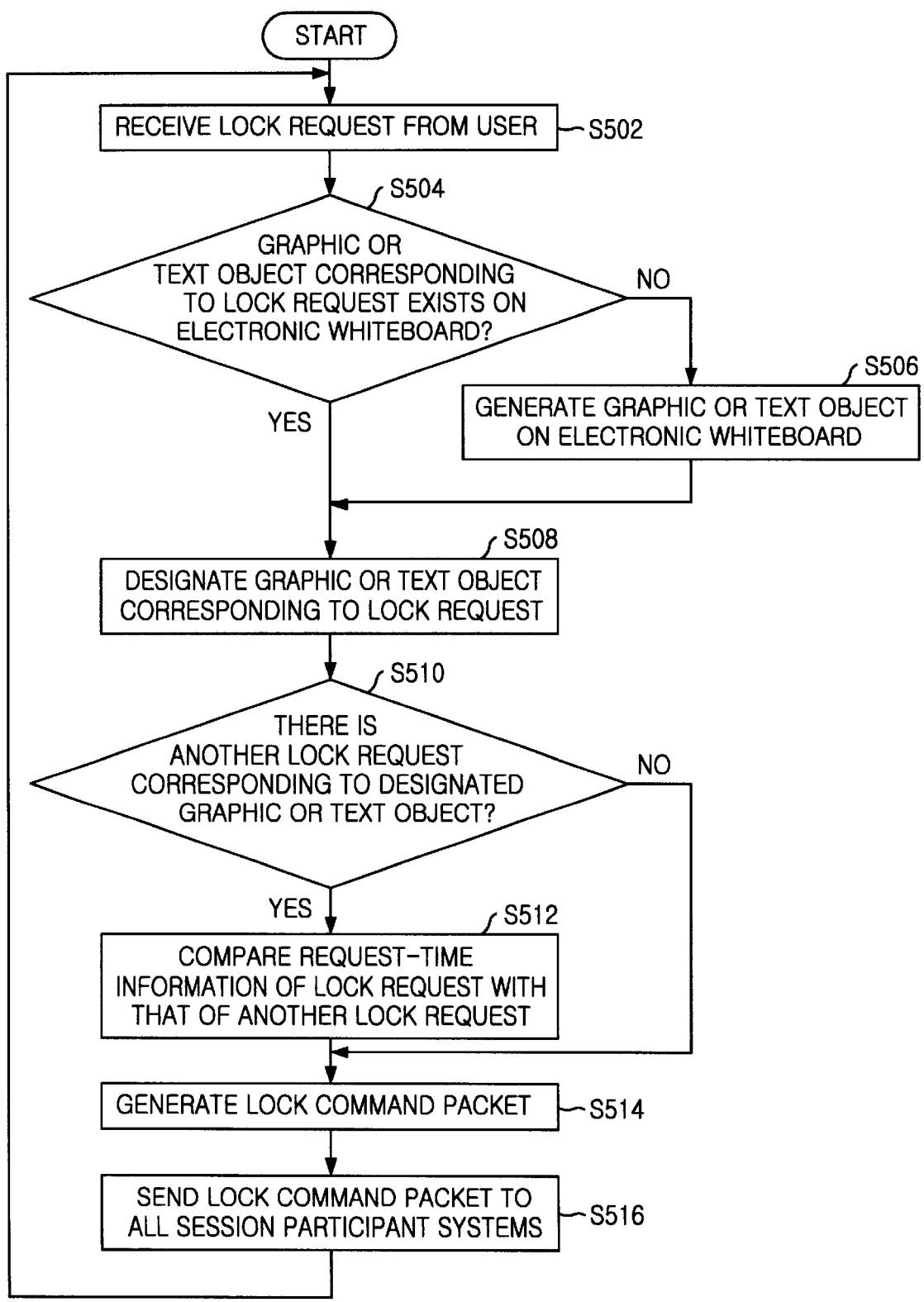

Referring to FIGS. 4 to 6, there are shown flowcharts describing a method for locking or prohibiting an access to a designated object by controlling a command sequence in accordance with the present invention. Referring to FIG. 4, there is shown a flowchart illustrating a method for locking or prohibiting an access to a designated object by controlling a command sequence in a session initiator system when the session initiator system receives a packet from one of session participant systems.

At step S402, a transport manager 250 of the session initiator system 200 shown in FIG. 3 receives the packet from the one of session participant systems.

At step S404, a packet analyzer 327 of the session initiator system 200 shown in FIG. 3 analyzes the packet received from the transport manager 250.

At step S406, the packet analyzer 327 determines whether the packet is a lock request packet.

At step S408, if the packet is not the lock request packet, an object manager 323 of the session initiator system 200 shown in FIG. 3 identifies a graphic or text object corresponding to the packet.

At step S410, the object manager 323 changes a state of the graphic or text object corresponding to the packet.

At step S412, if the packet is the lock request packet, a command sequence controller 326 of the session initiator system 200 shown in FIG. 3 determines whether there is another lock request packet with respect to the graphic or text object corresponding to the lock request packet.

At step S414, if there is another lock request packet with respect to the graphic or text object corresponding to the lock request packet, the command sequence controller 326 compares a transmission time of the lock request packet with that of another lock request packet to control a sequence of object lock commands. The lock request packet and another lock request packet have information of the transmission time, respectively.

At step S416, a packet generator 325 of the session initiator system shown in FIG. 3 generates a lock command packet.

At step S418, the packet generator 325 sends the lock command packet to all the session participant systems coupled to the session initiator system.

At step S420, the packet generator 325 generates a lock release command packet.

At step S422, a transport manager 250 shown in FIG. 3 sends the lock release command packet to a session participant system, which has sent a lock request packet having the information of an early transmission time to the session initiator system. At this time, only the session participant system receiving the lock release command packet has a priority over a designated graphic or text object to access the designated graphic or text object displayed on a shared electronic whiteboard.

If there is not another lock request packet with respect to the graphic or text object corresponding to the lock request packet, the packet generator 325 generates the lock command packet. Then, the packet generator 325 sends the lock command packet to all the session participant systems. Then, the packet generator 325 generates the lock release command packet. Then, the packet generator 325 sends the lock release command packet to the session participant system, which has sent the lock request packet to the session initiator system.

Referring to FIG. 5, there is shown a flowchart illustrating a method for locking or prohibiting an access to a designated object by controlling a command sequence in a session initiator system when a user interface of the session initiator system shown in FIG. 3 receives a lock request as a user request received from a user.

At step S502, a user interface 321 contained in an electronic whiteboard apparatus 312 shown in FIG. 3 receives the lock request from the user.

At step S504, an object manager 323 contained in the electronic whiteboard apparatus 312 shown in FIG. 3 determines whether a graphic or text object corresponding to the lock request exists on an electronic whiteboard 328 shown in FIG. 3.

At step S506, if the graphic or text object corresponding to the lock request does not exist on the electronic whiteboard 328, a graphic and text tool 322 generates the graphic or text object on the electronic whiteboard 328 in response to the user request.

At step S508, if the graphic or text object corresponding to the lock request exists on the electronic whiteboard 328, the object manager 323 designates the graphic or text object corresponding to the lock request.

At step S510, the object manager 323 determines whether there is another lock request corresponding to the designated graphic or text object.

At step S512, if there is another lock request corresponding to the designated graphic or text object, the command sequence controller compares request-time information of the lock request with that of another lock request.

At step S514, a packet generator 325 shown in FIG. 3 generates a lock command packet.

At step S516, a transport manager 250 sends the lock command packet to all the session participant systems.

If there is not another lock request with respect to the designated graphic or text object corresponding to the lock request, the packet generator 325 generates the lock command packet at step 514. The packet generator 325 sends the lock command packet to all the session participant systems at step 516.

Referring to FIG. 6, there is shown a flowchart illustrating a procedure of sending a lock request packet when a user interface 321 of a session participant system shown in FIG. 3 receives a lock request as a user request received from a user.

At step S602, the user interface 321 contained in an electronic whiteboard apparatus 312 shown in FIG. 3 receives the lock request from the user.

At step S604, an object manager 323 contained in the electronic whiteboard apparatus 312 shown in FIG. 3 determines whether a graphic or text object corresponding to the lock request exists on an electronic whiteboard 328 shown in FIG. 3.

At step S606, if the graphic or text object corresponding to the lock request does not exist on the electronic whiteboard 328, a graphic and text tool 322 generates the graphic or text object on the electronic whiteboard 328 in response to the user request.

At step S608, if the graphic or text object corresponding to the lock request exists on the electronic whiteboard 328, the object manager 323 designates the graphic or text object corresponding to the lock request.

At step S610, a lock state determination block 324 determines whether the graphic or text object has been locked.

At step S612, if the graphic or text object has been locked, the packet generator 325 generates a lock request packet.

At step S614, a transport manager 250 shown in FIG. 3 sends the lock request packet to a session initiator system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for locking or prohibiting an access to at least one object, comprising:
    a conference initiator having an electronic whiteboard that initiates an electronic conference, the electronic whiteboard containing at least one object, wherein said conference initiator gives a priority over an access to the object according to a sequence of lock requests; and
    a plurality of conference participants that participate in the electronic conference, thereby sharing the electronic whiteboard with said conference initiator, wherein one of said conference participants sends a lock request corresponding to the object to said conference initiator in order to obtain priority over the access to the object corresponding to the lock request from said conference initiator or prohibit access to the object performed by said conference participant not having priority, wherein said conference initiator includes:
        a user interface that interfaces with a user operating said conference initiator to receive a user request from the user;
        an electronic whiteboard that includes at least one object;
        an object generator that generates the object on said electronic whiteboard in response to the user request;
        a packet analyzer that analyzes packets received from said conference participant to determine whether the received packets are a lock request packet, wherein each packet has packet-transmission time information;
        an object manager that manages information relating to the object and changing the information relating to the object corresponding to a packet if the packet is determined to not be a lock request packet;
        a command sequence controller that determines whether there is another lock request packet corresponding to the object, said command sequence controller comparing the packet-transmission time information contained in the lock request packet with the packet-transmission time information contained in another lock request packet when there is another lock request packet; and
        a packet generator that generates a lock command packet to send a lock command packet to all said conference participants, said packet generator generating a lock release command packet to send the lock release command packet to said conference participant, which has sent the lock request packet having an early packet-transmission time information to said conference initiator, to give priority over the access to the object corresponding to the lock request packet or prohibiting the access to the object performed by said conference participator not having the priority.

2. The apparatus of claim 1, wherein said electronic whiteboard includes a plurality of whiteboard pages, wherein each electronic whiteboard page of said plurality of whiteboard pages includes at least one object.

3. The apparatus as recited in claim 2, wherein the object includes a graphic object and a text object.

4. The apparatus of claim 3, wherein a construction of said conference initiator is substantially the same as that of said conference participator.

5. The apparatus of claim 4, wherein said user interface further receives the lock request as the user request from the user.

6. The apparatus of claim 5, wherein said object manager further determines whether the object corresponding to the lock request from the user exists on said electronic whiteboard, said object manager designating the object corresponding to the lock request if the object corresponding to the lock request from the user exists on said electronic whiteboard.

7. The apparatus of claim 6, wherein said command sequence controller further determines whether there is another lock request corresponding to the designated object, said command sequence controller comparing request-time information contained in the lock request with that contained in another lock request when there is another lock request corresponding to the designated object.

8. The apparatus of claim 7, wherein said packet generator further generates the lock command packet when another lock request does not correspond to the designated object.

9. The apparatus of claim 8, further comprising:
    a communicator that sends the lock command packet to all conference participators to lock or prohibit the access to the designated object performed by the conference participators.

10. The apparatus of claim 9, wherein said conference initiator and said conference participator are implemented as a personal computer.

11. The apparatus of claim 10, wherein each conference participator includes:
    a second user interface that interfaces with a user operating said conference participator to receive the lock request as the user request from the user;
    a second object generator that generates the object on said electronic whiteboard in response to the user request;
    a lock state determiner that determines whether the object has been locked;
    a second packet generator that generates the lock request packet to send the lock request packet to said conference initiator when the object has been locked; and
    a second communicator that sends the lock request packet to said conference initiator.

12. An electronic conferencing system for locking or prohibiting an access to at least one object, comprising:
- a conference initiator having an electronic whiteboard that initiates an electronic conference, the electronic whiteboard containing at least one object, wherein said conference initiator gives priority over an access to the object according to a sequence of lock requests; and
- a plurality of conference participators that participate in the electronic conference, sharing the electronic whiteboard with said conference initiator, wherein one of said conference participators sends a lock request corresponding to the object to said conference initiator to obtain priority over the access to the object corresponding to the lock request from said conference initiator or prohibit access to the object performed by said conference participators not having priority, wherein said conference initiator includes:
  - a user interface that interfaces with a user operating said conference initiator to receive a user request from the user;
  - an electronic, whiteboard that includes at least one object;
  - an object generator that generates the object on said electronic whiteboard in response to the user request;
  - a packet analyzer that analyzes packets received from said conference participator to determine whether the packets are a lock request packet, wherein each packet has packet-transmission time information;
  - an object manager that manages information relating to the object and changes the information relating to the object corresponding to a packet when the packet is not the lock request packet;
  - a command sequence controller that determines whether there is another lock request packet corresponding to the object, said command sequence controller comparing the packet-transmission time information contained in the lock request packet with the packet-transmission time information contained in another lock request packet when there is another lock request packet; and
  - a packet generator that generates a lock command packet to send the lock command packet to all said conference participators, said packet generator generating a lock release command packet to send the lock release command packet to said conference participator, which has sent the lock request packet having an early packet-transmission time information to said conference initiator, giving priority over the access to the object corresponding to the lock request packet or prohibiting the access to the object performed by said conference participator not having the priority.

13. The electronic conferencing system as recited in claim 12, further comprising:
- a resource allocation means coupled to said conference initiator means and said conference participant means for allocating available conference resources to said conference initiator means and said conference participant means necessary for the electronic conference.

14. The electronic conferencing system of claim 12, wherein said electronic whiteboard includes a plurality of whiteboard pages, wherein each whiteboard page of said electronic whiteboard pages includes at least one object.

15. The electronic conferencing system as recited in claim 14, wherein the object includes a graphic object and a text object.

16. The electronic conferencing system of claim 15, wherein the object includes a graphic object and a text object.

17. The electronic conferencing system of claim 16, wherein said user interface further receives the lock request as the user request from the user.

18. The electronic conferencing system of claim 17, wherein said object manager further determines whether the object corresponding to the lock request from the user exists on said electronic whiteboard, said object manager designating the object corresponding to the lock request when the object corresponding to the lock request from the user exists on said electronic whiteboard.

19. The electronic conferencing system of claim 18, wherein said command sequence controller further determines whether there is another lock request corresponding to the designated object, said command sequence controller comparing request-time information contained in the lock request with that contained in another lock request when there is another lock request corresponding to the designated object.

20. The electronic conferencing system of claim 19, wherein said packet generator further generates the lock command packet when there is not another lock request corresponding to the designated object.

21. The electronic conferencing system of claim 20, further comprising:
- a communicator that sends the lock command packet to said conference participator, thereby locking or prohibiting the access to the designated object performed by the said conference participator.

22. The electronic conferencing system of claim 21, wherein said conference initiator and said conference participator are implemented as a personal computer.

23. The electronic conferencing system of claim 22, wherein each conference participator includes:
- a second user interface that interfaces with a user operating said conference participator to receive the lock request as the user request from the user;
- a second object generator that generates the object on said electronic whiteboard in response to the user request;
- a lock state determiner that determines whether the object has been locked;
- a second packet generator that generates the lock request packet to send the lock request packet to said conference initiator when the object has been locked; and
- a second communicator that sends the lock request packet to said conference initiator.

24. A method for locking or prohibiting an access to at least one object in an electronic conferencing system, comprising:
- initiating an electronic conference in the conference initiator system having an electronic whiteboard, the electronic whiteboard containing at least one object;
- participating conference participant systems in the electronic conference, thereby sharing the electronic whiteboard with the conference initiator system;
- sending a lock request corresponding to the object from a conference participant system to the conference initiator system in order to obtain priority over the access to the object corresponding to the lock request from the conference initiator system or prohibit the access to the object performed by another conference participant system not having priority; and
- giving priority over an access to the object to the conference participant system according to a sequence of lock requests in response to the lock request, wherein giving priority over an access to the object comprises:

analyzing packets received from the conference participant systems, thereby determining whether the packets are a lock request packet, respectively, wherein each of packets has packet-transmission time information;

changing information relating to the object corresponding to the packet when a packet is not the lock request packet;

determining whether there is another lock request packet corresponding to the object;

comparing the packet-transmission time information contained in the lock request packet with the packet-transmission time information contained in the another lock request packet when there is another lock request packet;

generating a lock command packet to send the lock command packet to all the conference participant systems; and generating a lock release command packet to send the lock release command packet to the conference participant system, which has sent the lock request packet having an early packet-transmission time information to the conference initiator system, thereby giving priority over the access to the object corresponding to the lock request packet or prohibiting the access to the object performed by another conference participant system not having the priority.

25. The method of claim 24, further comprising:

allocating available conference resources to the conference initiator system and the conference participant systems necessary for an electronic conference.

26. The method of claim 25, wherein sending a lock request comprises:

receiving the lock request as a user request from a user operating the conference participant system;

generating the object on the electronic whiteboard in response to the user request;

determining whether the object has been locked;

generating the lock request packet to send the lock request packet to the conference initiator system when the object has been locked; and sending the lock request packet to the conference initiator system.

27. The method of claim 24, further comprising:

receiving the lock request as the user request from a user operating the conference initiator system;

determining whether the object corresponding to the lock request from the user exists on the electronic whiteboard;

designating the object corresponding to the lock request when the object corresponding to the lock request from the user exists on said electronic whiteboard;

determining whether there is another lock request corresponding to the designated object;

comparing request-time information contained in the lock request with that contained in another lock request when there is another lock request corresponding to the designated object;

generating the lock command packet when there is not another lock request corresponding to the designated object; and sending the lock command packet to all conference participant systems to lock or prohibit access to the designated object performed by the all the conference participant systems.

28. The method of claim 27, wherein the electronic whiteboard includes a plurality of whiteboard pages, each whiteboard page of the electronic whiteboard pages including at least one object.

29. The method as recited in claim 28, wherein the object includes a graphic object and a text object.

30. A computer-readable media that stores program instructions, the program instructions being disposed on a computer to perform a method for locking or prohibiting an access to at least one object in an electronic conferencing system, comprising:

initiating an electronic conference in the conference initiator system having an electronic whiteboard, the electronic whiteboard containing at least one object;

participating conference participant systems in the electronic conference, thereby sharing the electronic whiteboard with the conference initiator system;

sending a lock request corresponding to the object from a conference participant system to the conference initiator system in order to obtain priority over the access to the object corresponding to the lock request from the conference initiator system or prohibit the access to the object performed by another conference participant system not having the priority; and giving priority over an access to the object to the conference participant system according to a sequence of lock requests in response to the lock request, wherein said giving priority over an access comprises:

analyzing packets received from the conference participant systems to determine whether the packets are a lock request packet, wherein each packet has packet-transmission time information;

changing information relating to the object corresponding to the packet when a packet is not the lock request packet;

determining whether there is another lock request packet corresponding to the object;

comparing the packet-transmission time information contained in the lock request packet with that contained in the another lock request packet when there is another lock request packet;

generating a lock command packet to send the lock command packet to all conference participant systems; and generating a lock release command packet to send the lock release command packet to the conference participant system, which has sent the lock request packet having an early packet-transmission time information to the conference initiator system, giving priority over the access to the object corresponding to the lock request packet or prohibiting the access to the object performed by another conference participant system not having the priority.

31. The computer-readable media of claim 30, further comprising:

allocating available conference resources to the conference initiator system and the conference participant systems necessary for an electronic conference.

32. The computer-readable media of claim 31, wherein sending a lock request comprises:

receiving the lock request as a user request from a user operating the conference participant system;

generating the object on the electronic whiteboard in response to the user request;

determining whether the object has been locked;

generating the lock request packet to send the lock request packet to the conference initiator system when the object has been locked; and sending the lock request packet to the conference initiator system.

33. The computer-readable media of claim 30, further comprising:

receiving the lock request as the user request from a user operating the conference initiator system;

determining whether the object corresponding to the lock request from the user exists on the electronic whiteboard;

designating the object corresponding to the lock request when the object corresponding to the lock request from the user exists on said electronic whiteboard;

determining whether there is another lock request corresponding to the designated object;

comparing request-time information contained in the lock request with that contained in another lock request when another lock request corresponds to the designated object;

generating the lock command packet when there is not another lock request corresponding to the designated object; and sending the lock command packet to all conference participant systems to lock or prohibit the access to the designated object performed by all the conference participant systems.

\* \* \* \* \*